US008806626B2

(12) United States Patent
Gardner (10) Patent No.: US 8,806,626 B2
(45) Date of Patent: Aug. 12, 2014

(54) USING AGGREGATED DNS INFORMATION ORIGINATING FROM MULTIPLE SOURCES TO DETECT ANOMALOUS DNS NAME RESOLUTIONS

(71) Applicant: Symantec Corporation, Mountain View, CA (US)

(72) Inventor: Patrick Gardner, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 47 days.

(21) Appl. No.: 13/663,271

(22) Filed: Oct. 29, 2012

(65) Prior Publication Data

US 2013/0061321 A1 Mar. 7, 2013

Related U.S. Application Data

(62) Division of application No. 12/698,745, filed on Feb. 2, 2010, now Pat. No. 8,321,551.

(51) Int. Cl.
*G06F 11/00* (2006.01)
*G06F 15/173* (2006.01)
*H04L 29/12* (2006.01)
*H04L 29/06* (2006.01)

(52) U.S. Cl.
CPC ...... *H04L 29/12066* (2013.01); *H04L 61/1511* (2013.01); *H04L 63/1425* (2013.01); *H04L 63/1441* (2013.01)
USPC .......................................... 726/22; 709/224

(58) Field of Classification Search
CPC ..... H04L 61/1511; H04L 63/00; H04L 63/12; H04L 63/14; H04L 63/1408; H04L 63/1425; H04L 63/1441; H04L 63/1483; H04L 63/1491
USPC ............... 709/223–225; 726/22–23
See application file for complete search history.

(56) References Cited

U.S. PATENT DOCUMENTS 7,490,073 B1 2/2009 Qureshi et al.
8,316,440 B1 * 11/2012 Hsieh et al. ..................... 726/22
(Continued)

FOREIGN PATENT DOCUMENTS

EP 2 222 048 A1 8/2010

OTHER PUBLICATIONS

Extended European Search Report for Counterpart Application 10845413.3, dated Mar. 14, 2014, 12 pages.

(Continued)

*Primary Examiner* — Joshua Joo
(74) *Attorney, Agent, or Firm* — Brill Law Office; Jeffrey Brill (57) ABSTRACT

A DNS security system collects and uses aggregated DNS information originating from a plurality of client computers to detect anomalous DNS name resolutions. A server DNS security component receives multiple transmissions of DNS information from a plurality of client computers, each transmission of DNS information concerning a specific instance of a resolution of a specific DNS name. The server component aggregates the DNS information from the multiple client computers. The server component compares DNS information received from a specific client computer concerning a specific DNS name to aggregated DNS information received from multiple client computers concerning the same DNS name to identify anomalous DNS name resolutions. Where an anomaly concerning received DNS information is identified, a warning can be transmitted to the specific client computer from which the anomalous DNS information was received.

9 Claims, 6 Drawing Sheets

(56) References Cited

U.S. PATENT DOCUMENTS

| | | | |
|---|---|---|---|
| 2005/0044406 A1 | 2/2005 | Stute | |
| 2007/0261112 A1* | 11/2007 | Todd et al. | 726/11 |
| 2008/0229017 A1 | 9/2008 | Plamondon | |
| 2009/0064330 A1 | 3/2009 | Shraim et al. | |
| 2009/0210526 A1* | 8/2009 | Howell et al. | 709/224 |
| 2009/0276771 A1 | 11/2009 | Nickolov et al. | |
| 2009/0327487 A1* | 12/2009 | Olson et al. | 709/224 |

OTHER PUBLICATIONS

"Botnet Detection by Monitoring Group Activities in DNS Traffic," Hyunsang Choi et al., Seventh International Conference on Computer and Information Technology, Oct. 16, 2007, 6 pages.

"The Domain Name Service as an IDS: How DNS can be used for detecting and monitoring badware in a network," Antoine Schonewille et al., Research Project for the Master System and Network Engineering at the University of Amsterdam, Feb. 5, 2006, 24 pages.

"Passive Monitoring of DNS Anomalies," Bojan Zdrnja et al., Detection of Intrusions and Malware, and vulnerability assessment; [Lecture notes in Computer Science], pp. 129-139, Springer Berlin Heidelbert, XP019096949, ISBN: 978-3-540-73613-4, 11 pages.

PCT International Search Report and Written Opinion for Application PCT/US10/62596 dated Mar. 31, 2011, 10 pages.

\* cited by examiner

USING AGGREGATED DNS INFORMATION ORIGINATING FROM MULTIPLE SOURCES TO DETECT ANOMALOUS DNS NAME RESOLUTIONS

PRIORITY CLAIM

This patent application is a divisional application and claims the benefit of pending patent application Ser. No. 12/698,745, art unit 2445, filed on Feb. 2, 2010, titled "Using Aggregated DNS Information Originating from Multiple Sources to Detect Anomalous DNS Name Resolutions."

TECHNICAL FIELD

This disclosure pertains generally to computer security, and more specifically to using aggregated DNS information originating from a plurality of sources to detected anomalous DNS name resolutions.

BACKGROUND

Many different types of Domain Name Service ("DNS") attacks are used by malicious parties to unknowingly direct a user to a malicious server. Attacks such as DNS cache poisoning, fast flux and double flux techniques, modification of local host files, local winSock/WinInet proxy configuration modification and others are used to modify attempts to resolve legitimate host names so as to redirect the resolutions to malicious servers. In many cases, it is very difficult for client based security software to detect that a client DNS record has been manipulated. In fact, many DNS attacks are not local to a client, and thus cannot be practicably addressed at the client end alone. On the other hand, many DNS attacks are local to individual clients, and thus cannot readily be addressed by network only security solutions. It would be desirable to address these issues.

SUMMARY

A DNS security system collects and uses aggregated DNS information originating from a plurality of computers (e.g., client computers, network computing devices) to detect anomalous DNS name resolutions, which can be indicative of DNS attacks. A client DNS security component runs on each of a plurality of client computers. Each client DNS security component identifies attempts to resolve DNS names on its client computer. This can comprise local resolution of DNS names, such as via a local cache or host file, and DNS queries transmitted to remote DNS servers. In either case, the client DNS security component gleans DNS information concerning identified attempts to resolve DNS names, for example by analyzing DNS settings local to the client computer, DNS queries, and resulting responses. Client security components running on the plurality of client computers transmit gleaned DNS information concerning each identified resolution of a DNS name to a server DNS security component running on a remote computer (e.g., a server). In some embodiments, one or more network DNS security components run at a network level, monitor network DNS traffic, and transmit gleaned DNS information concerning each identified resolution of a DNS name to the server DNS security component.

The server DNS security component receives multiple transmissions of DNS information from a plurality of client computers, each transmission of DNS information comprising information concerning a specific instance of a resolution of a specific DNS name. The server DNS security component aggregates the received multiple transmissions of DNS information from the plurality of client computers. The aggregated DNS information can be stored, for example in a database. The server DNS security component compares DNS information received from a specific client computer concerning a specific DNS name to aggregated DNS information received from multiple client computers concerning the same DNS name. For example, the DNS security component can compare information received from a specific client computer concerning a specific resolution of a specific DNS name to aggregated DNS information received from multiple client computers concerning multiple resolutions of the same DNS name.

By analyzing factors such as IP address of resolution, method of resolution, time to live, and DNS resource records, the server DNS security component can determine whether the DNS information received from the specific client computer concerning the specific DNS name is anomalous. Where the server DNS security component identifies at least one anomaly concerning the received DNS information such as a difference between the DNS information and a pattern indicated by aggregated DNS information concerning the same DNS name, the server DNS security component can determine that the received DNS information is anomalous, and transmit a warning or other indication to the specific client computer from which the anomalous DNS information was received. Responsive to determining that the received DNS information is anomalous, the server DNS security component can also modify the resolution, based on the aggregated DNS information received from multiple client computers concerning multiple resolutions of the same DNS name. Where the server DNS security component determines that the received DNS information is not anomalous, the server DNS security component can transmit an appropriate indication to the originating client computer.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
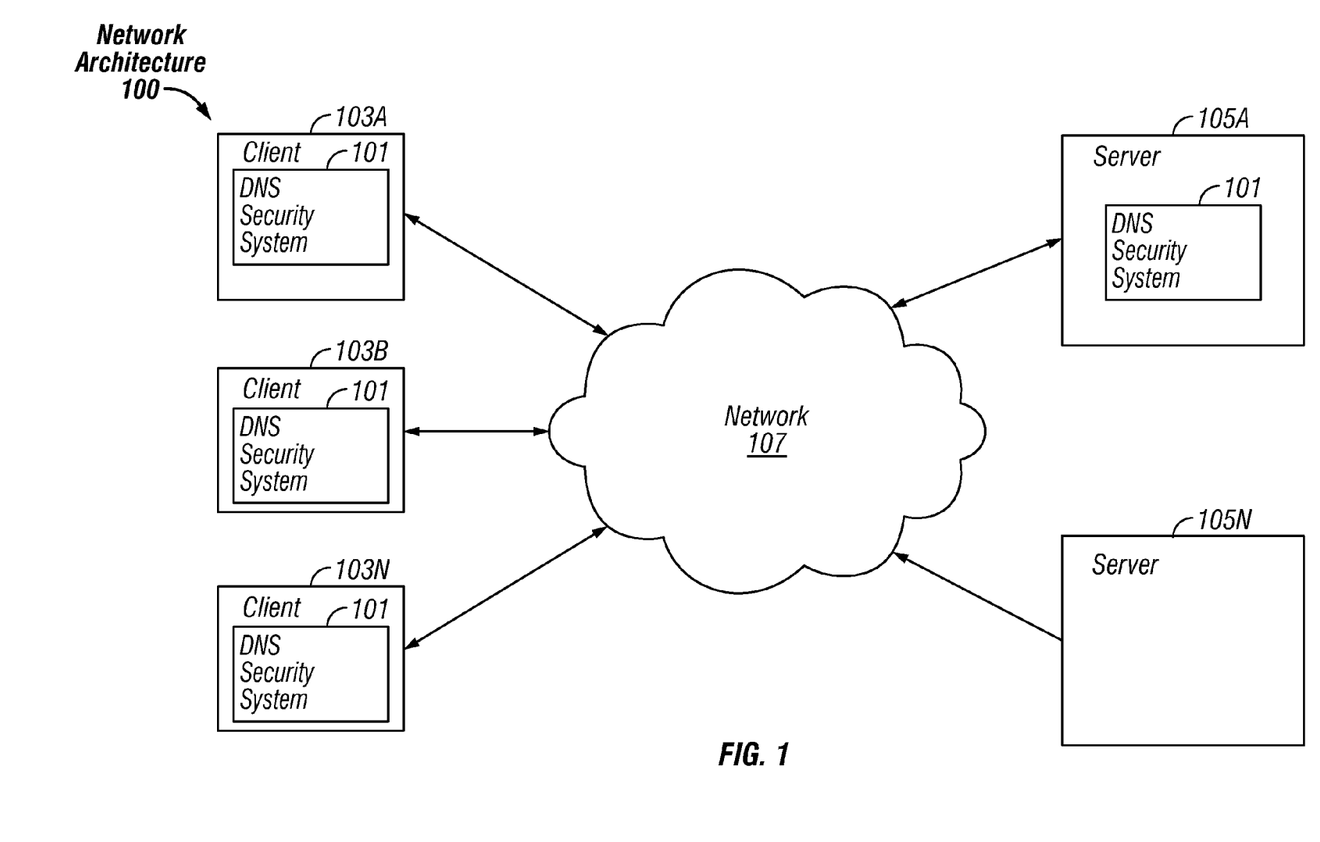
FIG. 1 is a block diagram of an exemplary network architecture in which a DNS security system can be implemented, according to some embodiments.

FIG. 1 is a block diagram illustrating an exemplary network architecture 100 in which a DNS security system 101 can be implemented. The illustrated network architecture 100 comprises multiple clients 103A, 103B and 103N, as well as multiple servers 105A and 105N. In FIG. 1, the DNS security system 101 is illustrated as residing on server 105A and clients 103A, 103B and 103N. It is to be understood that this is an example only, and in various embodiments various functionalities of this system 101 can be instantiated on a client 103, a server 105, a network computing device 313, or can be distributed between multiple clients 103 and/or servers 105 as desired.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
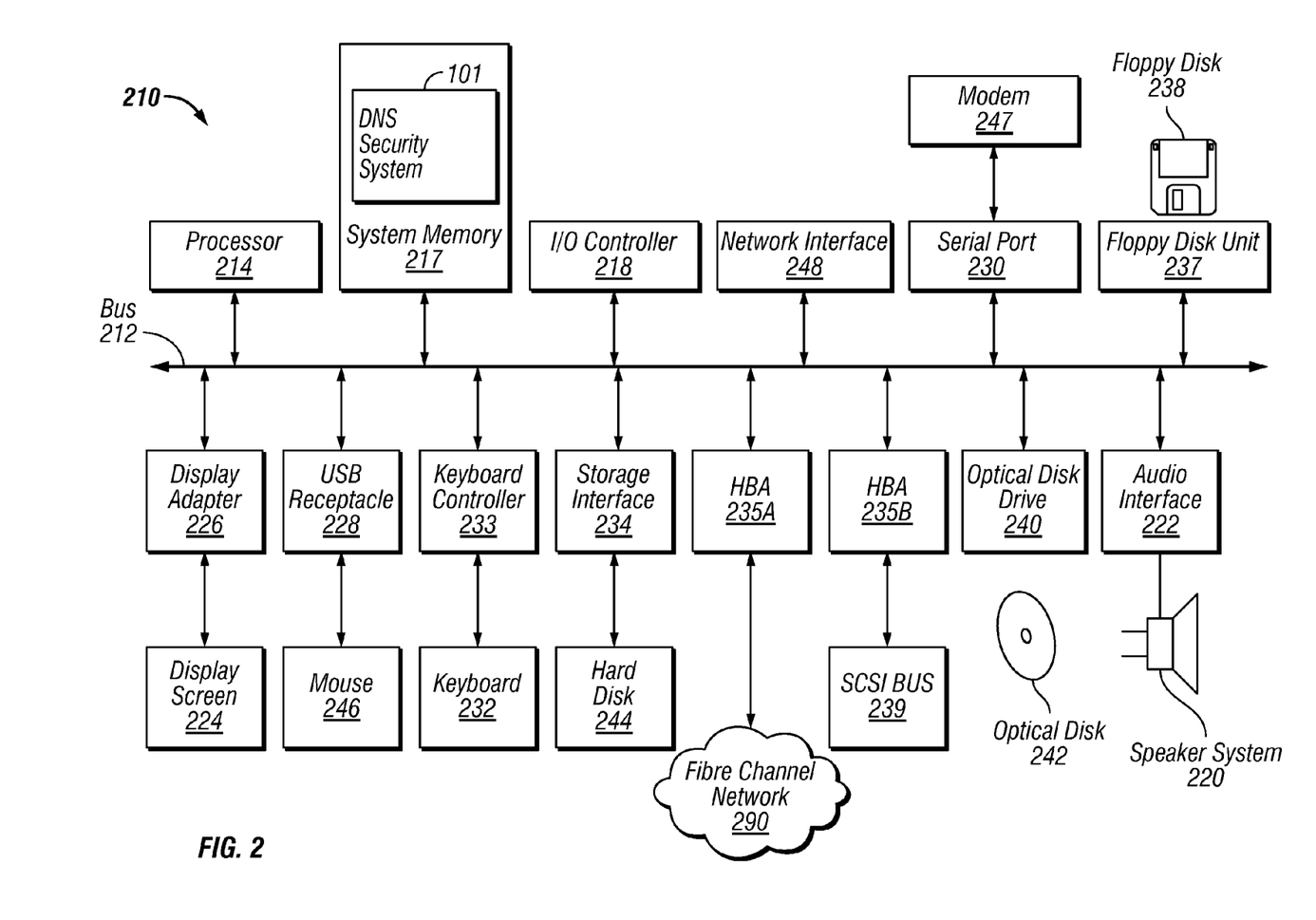
FIG. 2 is a block diagram of a computer system suitable for implementing a DNS security system, according to some embodiments.

FIG. 2 is a block diagram of a computer system 210 suitable for implementing a DNS security system 101. Clients 103, servers 105 and network computing devices 313 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the DNS security system 101 is illustrated as residing in system memory 217. The workings of the DNS security system 101 are explained in greater detail below in conjunction with FIGS. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
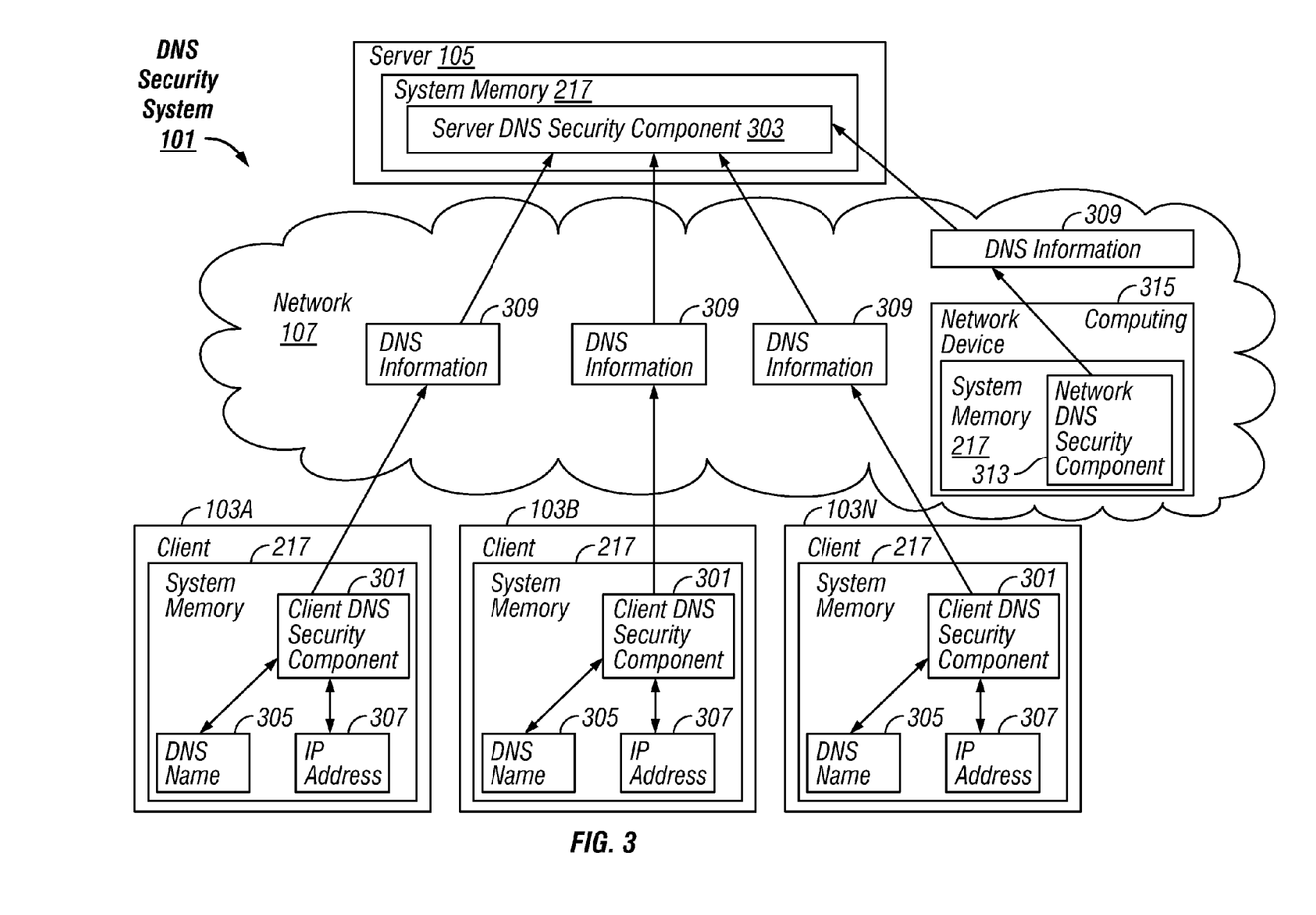
FIG. 3 is a block diagram of a high level overview of the operation of a DNS security system, according to some embodiments.
Figure 4:
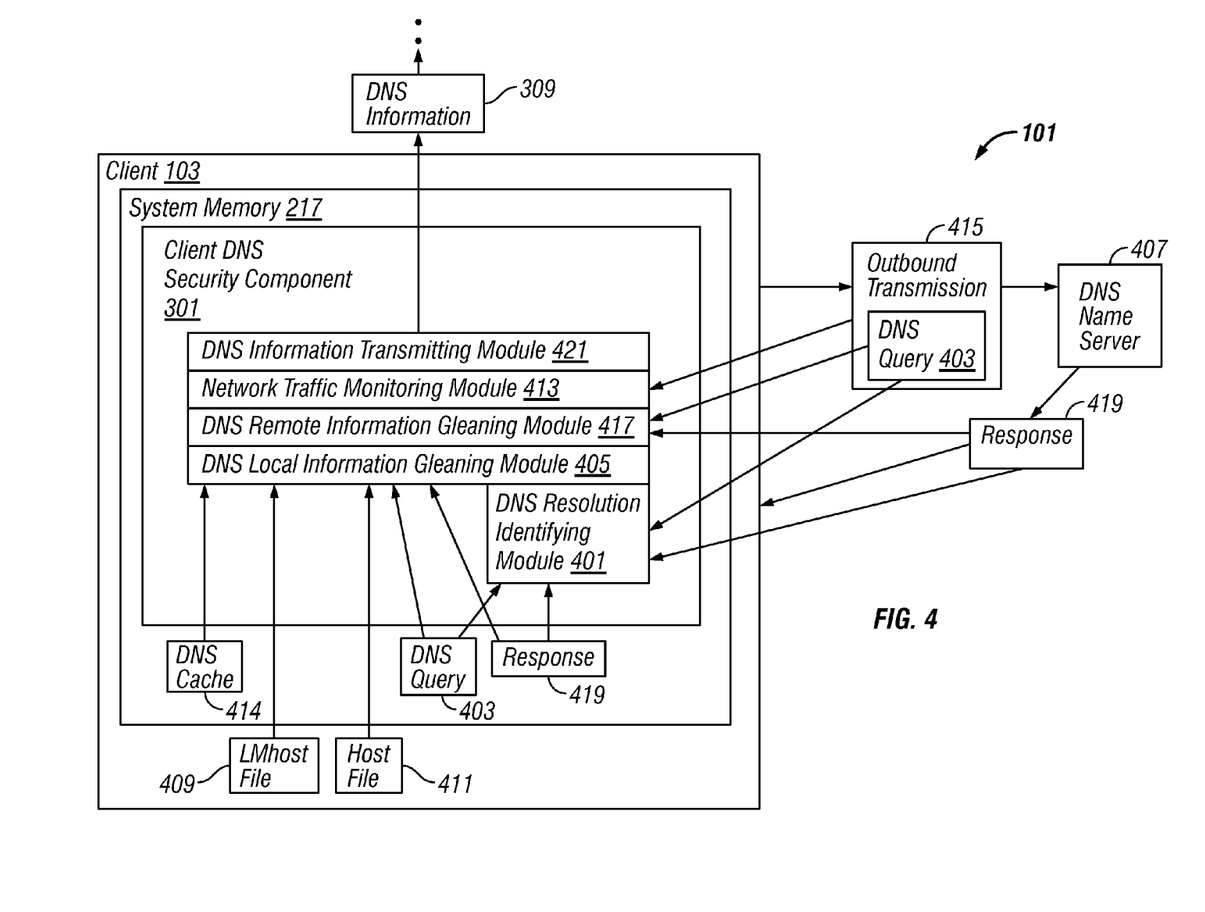
FIG. 4 is a block diagram of the operation of a client DNS security component, according to some embodiments.
Figure 5:
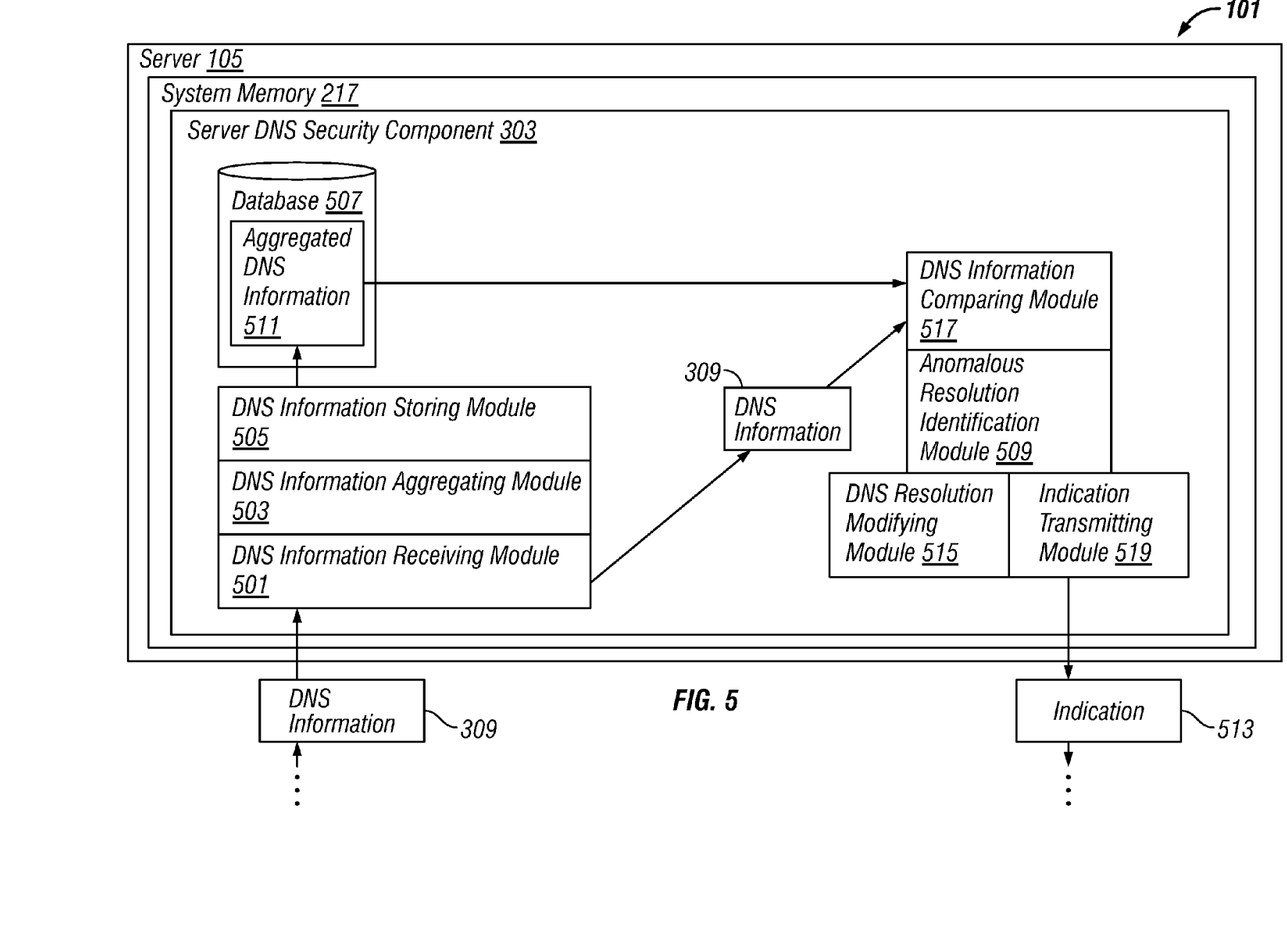
FIG. 5 is a block diagram of the operation of a server DNS security component, according to some embodiments.

FIG. 3 illustrates the high level operation of a DNS security system 101, residing in the system memory 217 of one server 105, three client 103 computer systems 210, and one network computing device 313, according to some embodiments. As described above, the functionalities of the DNS security system 101 can reside on a client 103, a server 105, a network computing device 313, or be distributed between multiple computer systems 210, including within a cloud-based computing environment in which the functionality of the DNS security system 101 is provided as a service over a network 107. It is to be understood that although only three clients 103 are illustrated in FIG. 3, in practice, many more would typically be deployed. For example, in some embodiments thousands (or more) clients 103 run client side DNS security system 101 functionality. Additionally, although only a single server 105 is illustrated, the server side DNS security system 101 functionality can be distributed between multiple servers 105 as desired. It is to be understood that although the DNS security system 101 is illustrated in FIGS. 3, 4 and 5 as a single entity, the illustrated DNS security system 101 represents a collection of functionalities, which can be instantiated as a single or multiple components and/or modules as desired (instantiations of specific, multiple components and modules of the DNS security system 101 are illustrated in FIGS. 3, 4 and 5). It is to be understood that the components and modules of the DNS security system 101 can be instantiated (for example as object code or executable images) within the system memory 217 (e.g., RAM, ROM, flash memory) of any computer system 210, such that when the processor 214 of the computer system 210 processes a component or module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the DNS security system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, in one embodiment a DNS security system 101 comprises a plurality of clients 103, each of which is running a client DNS security component 301 in its system memory 217, and a centralized server 105, which is running a server DNS security component 303 in its system memory 217. The specific modules of the client DNS security components 301 and the server DNS security component 303 are described in detail below in conjunction with FIGS. 4 and 5. By communicating with the client DNS security components 301 on the multiple clients 103, the server DNS security component 303 is able to glean DNS information 309 from a large user community (e.g., many clients 103) concerning the behavior of various DNS names 305 over time. For example, the server DNS security component 303 can learn in what manner DNS names 305 are resolved, to which IP addresses 307 they are resolved, etc. In this manner, the server DNS security component 303 monitors DNS activity on many clients 103, and, as described in detail below, is thus able to detect anomalous DNS name 305 resolution patterns, fast changing DNS names 305, and other irregular activity, and consequently adjudicate instances of the corresponding DNS names 305 as being anomalous. On the other hand, DNS names 305 observed as consistently resolving to the same IP addresses 307, being slow to change, etc., can be adjudicated as not being anomalous.

As described in greater detail below in conjunction with FIG. 4, the client DNS security component 301 on each client 103 inspects local DNS settings and DNS traffic going over the network 107 to and from the client 103. The collected DNS information 309 is submitted to the server DNS security component 303. The server DNS security component 303 correlates and analyzes resolution patterns for particular DNS names 305. Whenever a client 103 attempts to resolve a DNS name 305, the client 103 can issue a regular DNS query (not illustrated in FIG. 3) to be resolved either by a regular DNS server (not illustrated in FIG. 3) or locally (e.g., though a cache). The DNS query results in an IP address 307 corresponding to the DNS name 305. The client DNS security component 301 can send the IP address 307 and other corresponding DNS information 309 to the server DNS security component 303, which can determine whether the resolution of the DNS name 305 to the IP address 307 is anomalous.

By gathering information from a large number of clients 103 and thus having data indicating how given DNS names 305 have been resolved across the client 103 base over time, the server DNS security component 303 can identify anomalies in DNS resolution patterns. For example, suppose the server DNS security component 303 has DNS information 309 concerning many submissions on the DNS name "domain.com", all of which report a very high time to live and a consistent resolution to the same IP address 307 of "X.X.X.X". If the server DNS security component 303 then receives DNS information 309 from a client DNS security component 301 indicating that the same DNS name 305 resolved to the different IP address 307 of "Y.Y.Y.Y", the server DNS security component 303 could flag this resolution of the DNS name 305 as being anomalous.

As illustrated in FIG. 3, in some embodiments instead of or in addition to client DNS security components 301 being implemented on each client 103, one or more DNS security components 311 can be deployed in network 107, and monitor DNS traffic at a network level. A network DNS security component 311 can be instantiated, e.g., in the system memory 217 of an inline or passive network computing device 313. In a manner similar to that of a client DNS security component 301, a network DNS security component 311 monitors DNS traffic going over the network 107 to and from clients 103. The DNS information 309 collected by the network DNS security component 311 is also submitted to the server DNS security component 303 for correlation and analysis. As described above in the context of the client DNS security component 301, whenever a client 103 issues a DNS query, the DNS query results in an IP address 307 corresponding to the DNS name 305. As with a client DNS security component, the network DNS security component 311 which is monitoring network DNS traffic can send the IP address 307 and other corresponding DNS information 309 to the server DNS security component 303, which can determine whether the resolution of the DNS name 305 to the IP address 307 is anomalous. Although a network DNS security component 311 only detects information concerning DNS queries resolved over the network 107 as opposed to locally on individual clients 103, a network DNS security component 311 can gather and submit important DNS information 309 without being installed on a client computer 103.

Turning to FIG. 4, the operation of a client DNS security component 301 running in the system memory 217 of a client 103 is illustrated. A DNS resolution identifying module 401 of the client DNS security component 301 identifies the occurrence of attempts to resolve DNS names 305 by the client 103. In other words, the DNS resolution identifying module 401 detects whenever a regular DNS query 403 originates from the client 103. The DNS resolution identifying module 401 can use conventional implementation mechanics for identifying attempts to resolve DNS names 305. For example, where operating under Microsoft Windows®, the DNS resolution identifying module 401 can hook the appropriate API functions (e.g., RpcNsBindingLookup). Under other operating systems or some versions of Windows®, the specific implementation mechanics for performing this functionality can vary, but are within the skill set of those of ordinary skill in the relevant art. The application of such implementation mechanics within the currently described context will be readily apparent to artisans of such a skill level in light of this specification.

In some instances, the DNS query 403 can be resolved locally on the client 103, without generating a request over the network 107 to a DNS name server 407. For this reason, when the DNS resolution identifying module 401 identifies that an attempt to resolve a DNS name 305 is occurring, a DNS local information gleaning module 405 checks DNS settings on the client 103 that may be used to resolve the DNS query locally. This includes checking DNS settings such as local LMhost file 409 entries, local host file 411 entries, the DNS cache 414 on the client 103, local WinSock DNS settings (not illustrated) and any other DNS setting in the local network stack implementation (not illustrated). If the DNS name 305 is resolved locally, the DNS local information gleaning module 405 gleans corresponding DNS information 309, such as how the DNS name 305 was resolved, to which IP address 307 it was resolved, the time to live and any other information in the response 419 to the DNS query 403 (e.g., the one or more resource records returned in response to the DNS query 403).

In some cases, the DNS query 403 cannot be resolved locally, and is thus sent to a DNS name server 407 for resolution. To glean DNS information 309 concerning resolutions under such circumstances, a network traffic monitoring module 413 monitors outbound transmissions 415 originating from the client 103, and identifies outbound DNS queries 403. In one embodiment, the transmission monitoring module 413 comprises a Hypertext Transfer Protocol ("HTTP") proxy (either local, as illustrated, or remote) that is capable of detecting DNS queries 403 in the outbound HTTP stream. In another embodiment, the transmission monitoring module 413 is instantiated as a web browser plug-in that has access to DNS queries 403. In other embodiments, the transmission monitoring module 413 can be implemented at a lower level, e.g., by hooking the network protocol stack.

Conventional implementation mechanics can be used to instantiate the network traffic monitoring module 413. The implementation mechanics of instantiating (local and remote) HTTP proxies, web browser plug-ins, and hooking network protocol stacks are known to those of ordinary skill in the relevant art. The use thereof within the current context will be readily apparent to one of such a skill level in light of this specification. In FIG. 4 the network traffic monitoring module 413 is illustrated as running on the local client 103. In other embodiments, the network traffic monitoring module 413 runs remotely, for example on a proxy (not illustrated).

In any case, when a DNS request 403 is identified in an outbound transmission 415, a DNS remote information gleaning module 417 monitors the outbound DNS request 403 and the response 419 from the DNS name server 407, and gleans corresponding DNS information 309, such as how the DNS name 305 was resolved, to which IP address 307 it was resolved, etc.

Between the DNS local information gleaning module 405 and the DNS remote information gleaning module 417, DNS information 309 concerning each DNS query 403 and the corresponding response 419 is gleaned, such as whether the DNS query 403 was resolved locally or over the network 107, what DNS name server 407 the DNS query 403 was sent to if any, what IP address 307 the DNS name 305 resolved to, whether recursive lookup was performed, the time to live, and any other information in the DNS query 403 and/or response 419 as desired. As DNS information 309 concerning a given resolution of a specific DNS name 305 is gleaned, a DNS information transmitting module 421 transmits the DNS information 309 to the server DNS security component 303 for correlation and aggregation. It is to be understood that what specific DNS information 309 to glean and transmit is a variable design parameter.

Turning now to FIG. 5, a DNS information receiving module 501 of the server DNS security component 303 receives DNS information 309 concerning multiple resolutions of different DNS names 305 submitted by the plurality of clients 103. A DNS information aggregating module 503 aggregates the DNS information 309 submitted from the various clients 103. The DNS information aggregating module 503 transforms the individual transmissions of DNS information 309 concerning specific resolutions of specific DNS names 305 received from multiple clients 103 into aggregated DNS information 511 concerning many resolutions of different DNS names 305 on different clients 103, over time. A DNS information storing module 505 can store the aggregated DNS information 511 in a database (or other suitable storage mechanism) 507 for analysis as described below. In some embodiments, the DNS information 309 is aggregated into and stored as a tree structure organized by domain and sub-domain, such that all submissions of DNS information 309 concerning the same domain and/or sub-domain can be readily analyzed. Other aggregation and storage methodologies can be used in other embodiments. It is to be understood that what specific DNS information 309 to aggregate and store is a variable design parameter.

A DNS information comparing module 517 compares DNS information 309 submitted from individual clients 103 concerning specific DNS queries 403 on various DNS names 305 to the aggregated DNS information 511 (e.g., stored in the database 507). As a result of the comparing of submitted DNS information 309 concerning a current resolution of a specific DNS name 305 to aggregated DNS information 511 concerning multiple resolutions of the same DNS name 305, an anomalous resolution identification module 509 can identify anomalies in the DNS information 309 being submitted. For example, as a result of comparing a current submission concerning a specific DNS name 305 to aggregated DNS information 511 concerning the same DNS name 305, the anomalous resolution identification module 509 can detect differences in the DNS information 309 concerning the current DNS query 403 on that specific DNS name 305 and aggregated DNS information 511 concerning the same DNS name 305 collected over a period of time from multiple clients 103. The anomalous resolution identification module 509 can identify differences between the current DNS query 403 and aggregated DNS information 511 concerning the DNS name 305 of interest by looking at factors such as IP address(es) 307 to which the DNS name 305 resolved, method(s) of resolution (e.g., network 107, local host file 411, local cache 414, etc.), time(s) to live, other data in the response(s) 419 (e.g., other fields in the DNS resource record(s)), etc. The aggregated DNS information 511 for a given DNS name 305 comprises, in effect, a profile concerning that DNS name 305, indicating how and to which IP address(es) 307 it has resolved over time, etc. Responsive to comparing current DNS information 309 to aggregated DNS information 511, the anomalous resolution identification module 509 can identify whether or not the current DNS information 309 is anomalous. Detected anomalies can indicate DNS attacks, such as DNS poisoning, host file 411 modifications, etc.

It is to be understood that what specific current DNS information 309 to compare to what specific aggregated DNS information 511 for any given DNS name 305 is a variable design parameter. Additionally, how much and what type of variation between the current DNS information 309 and aggregated DNS information 511 for any given DNS name 305 is to be considered indicative of an anomalous resolution is also a variable design parameter. For example, in some embodiments, where the aggregated DNS information 511 for a specific DNS name 305 indicates that the DNS name 305 has always resolved to a small set of IP addresses 307 with long times to live, a current resolution to an IP address 307 outside of the set and/or with a short time to live can be adjudicated as being anomalous. On the other hand, for DNS names 305 that have historically resolved to a much larger set of IP addresses 307 with short times to live (e.g., DNS names 305 in content distribution networks such as Hewlett Packard, Microsoft, and Alkami), a wider range of resolutions would typically be considered non-anomalous, although resolution patterns outside of this wider range could still be flagged. In the case in which there is little or no aggregated DNS information 511 concerning a given DNS name 305 (e.g., a specific domain and sub-domain combination, such as "www.domain.com/sub-domain"), the DNS resolution modifying module 515 can isolate a higher level portion of the domain name 305 (e.g., www.domain.com), and compare current DNS information 309 to aggregated DNS information 511 concerning just the isolated portion of the domain name 305.

In some embodiments, the anomalous resolution identification module 509 simply flags what it adjudicates as being anomalous resolutions of a DNS name 305, and an indication transmitting module 519 transmits a warning indication 513 to the client 103 that submitted the current DNS information 309 and/or to a third party, such as a central security server (not illustrated). In some embodiments such a warning indication 513 is a simple notice that the DNS information 309 concerning the current resolution of the DNS name 305 reported by the client 103 does not match the aggregated DNS information 511 concerning that DNS name 305. In other embodiments, these indications 513 can have varying levels of additional information as desired (e.g., a description of why the resolution was adjudicated as being anomalous, a rating of how anomalous the resolution is considered to be on a sliding scale, one or more suggested remedies, etc.). On the other side of the coin, where the anomalous resolution identification module 509 does not identify any anomalies concerning a specific resolution of a given DNS name 305, the anomalous resolution identification module 509 can flag that as well, for example via the indication transmitting module 519 transmitting an indication 513 to the client 103 that submitted the current DNS information 309 (and/or to a third party) that the resolution has not been found to be anomalous.

In some embodiments, a DNS resolution modifying module 515 on the server 105 can, in addition to or instead of transmitting a warning 513, change or block the attempted resolution, or take other action as desired. In some embodiments, DNS resolution modifying modules 515 can be instantiated on one or more clients 103, instead of or in addition to the server 105.

Figure 6:
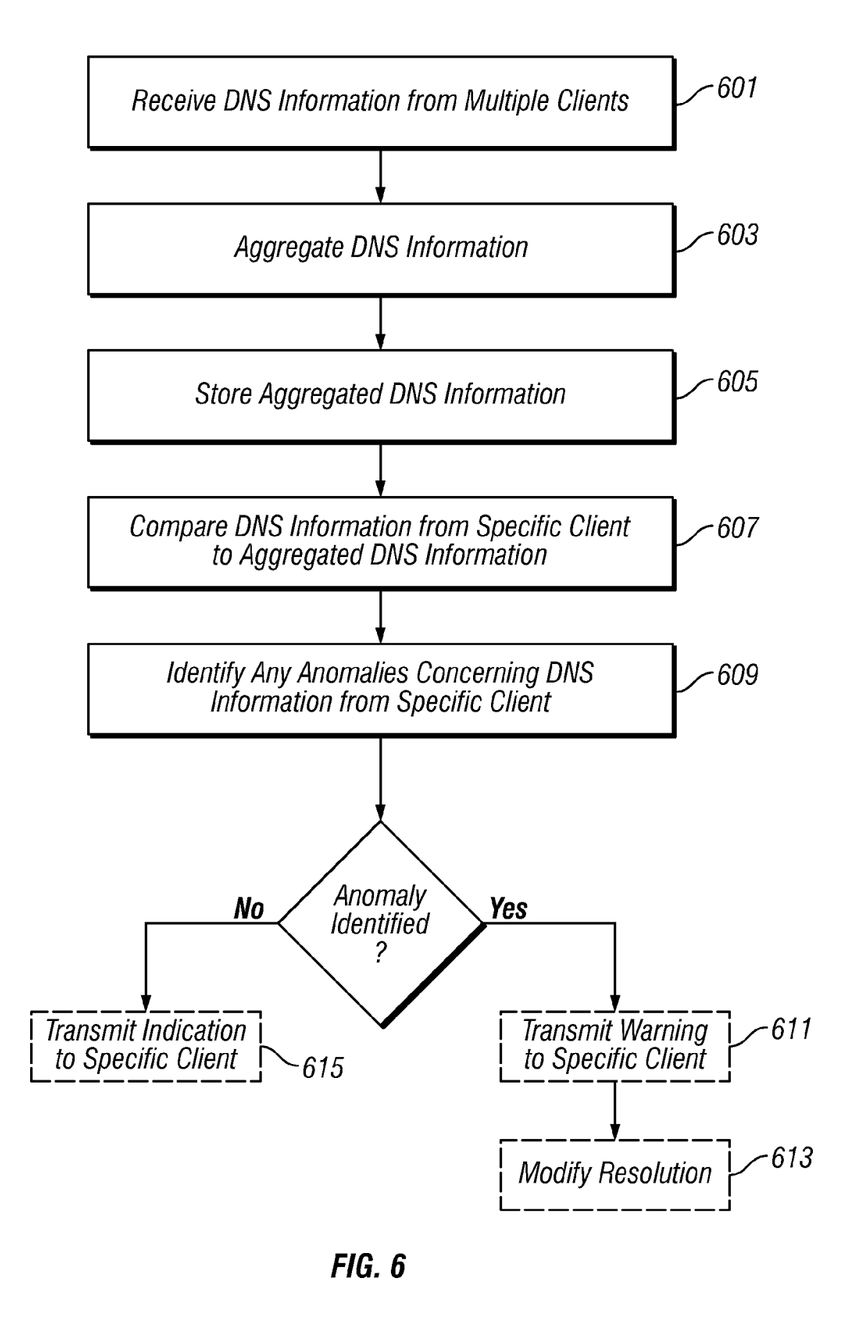
FIG. 6 is a flowchart of the operation of a DNS security system, according to some embodiments.

FIG. 6 is a flowchart illustrating operation of a DNS security system 101 (FIG. 1), according to some embodiments. A DNS information receiving module 501 (FIG. 5) of the server DNS security component 303 (FIG. 3) running in the system memory 217 (FIG. 2) of the server 105 (FIG. 1) receives 601 multiple transmissions of DNS information 309 (FIG. 3) from a plurality of client computers 103 (FIG. 1). Each received transmission of DNS information 309 (FIG. 3) comprises information concerning a specific instance of a resolution of a specific DNS name 305 (FIG. 3) on a specific client 103 (FIG. 1). A DNS information aggregating module 503 (FIG. 5) of the server DNS security component 303 (FIG. 3) aggregates 603 the multiple transmissions of DNS information 309 (FIG. 3) received from the plurality of client computers 103 (FIG. 1). A DNS information storing module 505 (FIG. 5) of the server DNS security component 303 (FIG. 3) can store 605 the aggregated DNS information 511 (FIG. 5), for example in a database 507 (FIG. 5). A DNS information comparing module 517 (FIG. 5) of the server DNS security component 303 (FIG. 3) compares 607 DNS information 309 (FIG. 3) received from a specific client computer 103 (FIG. 1) concerning a specific DNS name 305 (FIG. 3) to aggregated DNS information 511 (FIG. 5) received from multiple client computers 103 (FIG. 1) concerning the same DNS name 305 (FIG. 3). An anomalous resolution identification module 509 (FIG. 5) of the of the server DNS security component 303 (FIG. 3) identifies 609 any anomalies concerning the received DNS information 309 (FIG. 3), such as a difference between the received DNS information 309 (FIG. 3) and a pattern indicated by aggregated DNS information 511 (FIG. 5) concerning the same DNS name 305 (FIG. 3).

Responsive to identifying at least one anomaly concerning the received DNS information 309 (FIG. 3), an indication transmitting module 519 of (FIG. 5) of the server DNS security component 303 (FIG. 3) can transmit 611 a warning indication 513 (FIG. 3) to the specific client computer 103 (FIG. 1) from which the anomalous DNS information 309 (FIG. 3) was received. Additionally or instead, responsive to determining that the received DNS information 309 (FIG. 3) is anomalous, a DNS resolution modifying module 515 (FIG. 5) of the of the server DNS security component 303 (FIG. 3) can modify 613 the resolution of the DNS name 305 (FIG. 3). Where no anomalies are identified, the indication transmitting module 519 (FIG. 5) can transmit 615 an appropriate indication 513 (FIG. 5) to the originating client computer 103 (FIG. 1).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for providing DNS information to a server computer to detect anomalous DNS name resolutions, the method comprising the steps of:
   identifying, by a DNS security component running on a computer, attempts to resolve DNS names by at least one specific computer;
   gleaning, by the DNS security component running on the computer, DNS information concerning identified attempts to resolve DNS names by the at least one specific computer;
   transmitting, by the DNS security component running on the computer, gleaned DNS information concerning each identified resolution of a DNS name by the at least one specific computer, to a server DNS security component running on a remote computer;
   receiving, by the DNS security component running on the at least one specific computer, an indication that the DNS information concerning a specific attempt to resolve a specific DNS name by the at least one specific computer is anomalous, from the server DNS security component running on the remote computer to which gleaned DNS information is transmitted; and
   responsive to the receiving step, modifying, by the DNS security component running on the at least one specific computer, a resolution of the specific DNS name indicated as being anomalous.

2. The method of claim 1 wherein:
   the DNS security component running on a computer further comprises a client DNS security component running on a client computer; and
   gleaning, by the DNS security component running on the computer, DNS information concerning identified attempts to resolve DNS names by the computer further comprises:
      checking, by the client DNS security component running on the client computer, DNS settings local to the client computer; and
      gleaning, by the client DNS security component running on the client computer, DNS information concerning at least one local resolution of at least one DNS name.

3. The method of claim 1 wherein gleaning, by the DNS security component running on the computer, DNS information concerning identified attempts to resolve DNS names by the computer further comprises:
   monitoring, by the DNS security component running on the computer, outbound data transmission originating from client computers;

identifying, by the DNS security component running on the computer, at least one outbound DNS query and inbound resulting response; and gleaning, by the DNS security component running on the computer, DNS information concerning at least one DNS name associated with the at least one outbound DNS query and the resulting inbound response.

4. At least one non-transitory computer readable-storage medium for providing DNS information to a server computer to detect anomalous DNS name resolutions, the at least one non-transitory computer readable-storage medium storing computer executable instructions that, when loaded into computer memory and executed by at least one processor of a computing device, cause the computing device to perform the following steps:

identifying, by a DNS security component running on a computer, attempts to resolve DNS names by at least one specific computer;

gleaning, by the DNS security component running on the computer, DNS information concerning identified attempts to resolve DNS names by the at least one specific computer;

transmitting, by the DNS security component running on the computer, gleaned DNS information concerning each identified resolution of a DNS name by the at least one specific computer, to a server DNS security component running on a remote computer;

receiving, by the DNS security component running on the at least one specific computer, an indication that the DNS information concerning a specific attempt to resolve a specific DNS name by the at least one specific computer is anomalous, from the server DNS security component running on the remote computer to which gleaned DNS information is transmitted; and responsive to the receiving step, modifying, by the DNS security component running on the at least one specific computer, a resolution of the specific DNS name indicated as being anomalous.

5. The at least one non-transitory computer readable-storage medium of claim 4 wherein:

the DNS security component running on a computer further comprises a client DNS security component running on a client computer; and gleaning, by the DNS security component running on the computer, DNS information concerning identified attempts to resolve DNS names by the computer further comprises:

checking, by the client DNS security component running on the client computer, DNS settings local to the client computer; and gleaning, by the client DNS security component running on the client computer, DNS information concerning at least one local resolution of at least one DNS name.

6. The at least one non-transitory computer readable-storage medium of claim 4 wherein gleaning, by the DNS security component running on the computer, DNS information concerning identified attempts to resolve DNS names by the computer further comprises:

monitoring, by the DNS security component running on the computer, outbound data transmission originating from client computers;

identifying, by the DNS security component running on the computer, at least one outbound DNS query and inbound resulting response; and gleaning, by the DNS security component running on the computer, DNS information concerning at least one DNS name associated with the at least one outbound DNS query and the resulting inbound response.

7. A computer system for providing DNS information to a server computer to detect anomalous DNS name resolutions, the computer system comprising:

system memory;

a DNS resolution identifying module residing in the system memory, the DNS resolution identifying module being programmed to identify attempts to resolve DNS names by the computer system;

a DNS local information gleaning module and a DNS remote information gleaning module residing in the system memory, the DNS local information gleaning module and the DNS remote information gleaning module being programmed to glean DNS information concerning identified attempts to resolve DNS names by the computer system; and a DNS information transmitting module residing in the system memory, the DNS information transmitting module being programmed to transmit gleaned DNS information concerning each identified resolution of a DNS name by the computer system, to a server DNS security component running on a remote computer;

wherein the DNS remote information gleaning module is further programmed to receive an indication that the DNS information concerning a specific attempt to resolve a specific DNS name by the computer system is anomalous, from the server DNS security component running on the remote computer to which gleaned DNS information is transmitted, and in response to modify a resolution of the specific DNS name indicated as being anomalous.

8. The computer system of claim 7 wherein the computer system further comprises a client computer, and wherein the DNS local information gleaning module is further programmed to:

check DNS settings local to the client computer, and to glean DNS information concerning at least one local resolution of at least one DNS name.

9. The computer system of claim 7 further comprising:

a network traffic monitoring module residing in the system memory, the network traffic monitoring module being programmed to monitor outbound data transmission originating from the computer system; and wherein the DNS remote information gleaning module is further programmed to identify at least one outbound DNS query and inbound resulting response, and to glean DNS information concerning at least one DNS name associated with the at least one outbound DNS query and the resulting inbound response.

* * * * *